(12) United States Patent
Esbensen

(10) Patent No.: US 8,583,530 B2
(45) Date of Patent: Nov. 12, 2013

(54) CODE GENERATION BASED ON SPREADSHEET DATA MODELS

(75) Inventor: Peter K. Esbensen, Windsor, CT (US)

(73) Assignee: Hartford Fire Insurance Company, Hartford, CT (US)

(*) Notice: Subject to any disclaimer, the term of this patent is extended or adjusted under 35 U.S.C. 154(b) by 428 days.

(21) Appl. No.: 13/050,703

(22) Filed: Mar. 17, 2011

(65) Prior Publication Data

US 2012/0239592 A1 Sep. 20, 2012

(51) Int. Cl.
*G06Q 40/00* (2012.01)
(52) U.S. Cl.
USPC .................. 705/36 R; 705/4; 705/35
(58) Field of Classification Search
None
See application file for complete search history.

(56) References Cited

U.S. PATENT DOCUMENTS

| | | | |
|---|---|---|---|
| 5,893,071 A * | 4/1999 | Cooperstein | 705/4 |
| 6,282,520 B1 | 8/2001 | Schirripa | |
| 6,292,787 B1 | 9/2001 | Scott et al. | |
| 7,916,864 B2 | 3/2011 | Juffa | |
| 2005/0071261 A1 * | 3/2005 | Carney | 705/35 |
| 2009/0076859 A1 | 3/2009 | Phillips | |
| 2009/0125370 A1 | 5/2009 | Blondeau et al. | |
| 2009/0256855 A1 | 10/2009 | Tran | |

FOREIGN PATENT DOCUMENTS

WO WO 95/06290 * 3/1995

OTHER PUBLICATIONS

Michaud, Richard O., "The Markowitz Optimization Enigma: Is 'Optimized' Optimal?", Financial Analysts Journal, pp. 31-42, Jan.-Feb. 1989.*

* cited by examiner

*Primary Examiner* — Robert Niquette
(74) *Attorney, Agent, or Firm* — Volpe And Koenig, P.C.

(57) ABSTRACT

Disclosed herein are processor-executable methods, computing systems, and related technology for the generation of software code based on spreadsheet data models. A spreadsheet data model may be parsed, and an intermediate representation may be generated based on the spreadsheet data model. Software code may be generated based on the intermediate representation. The software code may be in a high-level language such as C or C++, or in any other appropriate language. Alternatively or additionally, the software code may include the use of General Purpose Computing On Graphics Processing Units (GPGPU) technology. The software code may be compiled, and then executed to obtain results data.

30 Claims, 13 Drawing Sheets

| | A | B | C | D | E | F | G | H | I | J | K |
|---|---|---|---|---|---|---|---|---|---|---|---|
| 1 | Customer Data (Input) | | | | | | | | | | |
| 2 | Age | Account Value | | | | | | | | | |
| 3 | 45 | $10,000 | | | | | | | | | |
| 4 | | | | | | | | | | | |
| 5 | Financial Model | | | | | | Market Scenario | | | Mortality Table | |
| 6 | Time Period (Years) | Account Value | Age | Death Rate | Account Value After Mortality | | Time Period (Years) | Market Change | | Age | Death Rate |
| 7 | 0 | $ 10,000.00 | 45 | | $ 10,000.00 | | 0 | N/A | | 45 | N/A |
| 8 | 1 | $ 10,200.00 | 46 | 1.1% | $ 10,087.80 | | 1 | 2% | | 46 | 1.1% |
| 9 | 2 | $ 9,690.00 | 47 | 1.2% | $ 9,573.72 | | 2 | -5% | | 47 | 1.2% |
| 10 | 3 | $ 9,399.30 | 48 | 1.3% | $ 9,277.11 | | 3 | -3% | | 48 | 1.3% |
| 11 | 4 | $ 9,681.28 | 49 | 1.4% | $ 9,545.74 | | 4 | 3% | | 49 | 1.4% |
| 12 | 5 | $ 10,165.34 | 50 | 1.4% | $ 10,023.03 | | 5 | 5% | | 50 | 1.4% |
| 13 | 6 | $ 11,181.88 | 51 | 1.5% | $ 11,014.15 | | 6 | 10% | | 51 | 1.5% |
| 14 | 7 | $ 12,523.70 | 52 | 1.5% | $ 12,335.85 | | 7 | 12% | | 52 | 1.5% |
| 15 | 8 | $ 13,275.12 | 53 | 1.7% | $ 13,049.45 | | 8 | 6% | | 53 | 1.7% |
| 16 | 9 | $ 13,673.38 | 54 | 1.8% | $ 13,427.26 | | 9 | 3% | | 54 | 1.8% |
| 17 | 10 | $ 13,946.85 | 55 | 1.9% | $ 13,681.86 | | 10 | 2% | | 55 | 1.9% |

| | A | B | C | D | E | F | G | H | I | J | K |
|---|---|---|---|---|---|---|---|---|---|---|---|
| 1 | | | | | | | | | | | |
| 2 | Customer Data (Input) | | | | | | | | | | |
| 3 | Age | 45 | | | | | | | | | |
| 4 | Account Value | $10,000 | | | | | | | | | |
| 5 | Financial Model | | | | | | Market Scenario | | | Mortality Table | |
| 6 | Time Period (Years) | | | | Account Value After Mortality | | Time Period (Years) | Market Change | | Age | Death Rate |
| 7 | 0 | $ 10,000.00 | 45 | | $ 10,000.00 | | 0 | N/A | | 45 | N/A |
| 8 | 1 | $ 9,690.00 | 46 | 1.1% | $ 10,087.80 | | 1 | 2% | | 46 | 1.1% |
| 9 | 2 | $ 9,399.30 | 47 | 1.2% | $ 9,573.72 | | 2 | -5% | | 47 | 1.2% |
| 10 | 3 | $ 9,681.28 | 48 | 1.3% | $ 9,277.11 | | 3 | -3% | | 48 | 1.3% |
| 11 | 4 | $ 10,165.34 | 49 | 1.4% | $ 9,545.74 | | 4 | 3% | | 49 | 1.4% |
| 12 | 5 | $ 11,181.88 | 50 | 1.4% | $ 10,023.03 | | 5 | 5% | | 50 | 1.4% |
| 13 | 6 | $ 12,523.70 | 51 | 1.5% | $ 11,014.15 | | 6 | 10% | | 51 | 1.5% |
| 14 | 7 | $ 13,275.12 | 52 | 1.5% | $ 12,335.85 | | 7 | 12% | | 52 | 1.5% |
| 15 | 8 | $ 13,673.38 | 53 | 1.7% | $ 13,049.45 | | 8 | 6% | | 53 | 1.7% |
| 16 | 9 | $ 13,946.85 | 54 | 1.8% | $ 13,427.26 | | 9 | 3% | | 54 | 1.8% |
| 17 | 10 | | 55 | 1.9% | $ 13,681.86 | | 10 | 2% | | 55 | 1.9% |

| | A | B | C | D | E | F | G | H | I | J | K |
|---|---|---|---|---|---|---|---|---|---|---|---|
| 1 | | | | | | | | | | | |
| 2 | Customer Data (Input) | | | | | | | | | | |
| 3 | Age | Account Value | | | | | | | | | |
| 4 | 45 | $10,000 | | | | | | | | | |
| 5 | | | Financial Model | | | | Market Scenario | | | Mortality Table | |
| 6 | Time Period (Years) | Account Value | Age | Death Rate | After Mortality | | Time Period (Years) | Market Change | | Age | Death Rate |
| 7 | 0 | $ 10,000.00 | 45 | | $ 10,000.00 | | 0 | N/A | | 45 | N/A |
| 8 | 1 | $ 10,200.00 | 46 | 1.1% | $ 10,087.80 | | 1 | 2% | | 46 | 1.1% |
| 9 | 2 | $ 9,690.00 | 47 | 1.2% | $ 9,573.72 | | 2 | -5% | | 47 | 1.2% |
| 10 | 3 | $ 9,399.30 | 48 | 1.3% | $ 9,277.11 | | 3 | -3% | | 48 | 1.3% |
| 11 | 4 | $ 9,681.28 | 49 | 1.4% | $ 9,545.74 | | 4 | 3% | | 49 | 1.4% |
| 12 | 5 | $ 10,165.34 | 50 | 1.4% | $ 10,023.03 | | 5 | 5% | | 50 | 1.4% |
| 13 | 6 | $ 11,181.88 | 51 | 1.5% | $ 11,014.15 | | 6 | 10% | | 51 | 1.5% |
| 14 | 7 | $ 12,523.70 | 52 | 1.5% | $ 12,335.85 | | 7 | 12% | | 52 | 1.5% |
| 15 | 8 | $ 13,275.12 | 53 | 1.7% | $ 13,049.45 | | 8 | 6% | | 53 | 1.7% |
| 16 | 9 | $ 13,673.38 | 54 | 1.8% | $ 13,427.26 | | 9 | 3% | | 54 | 1.8% |
| 17 | 10 | $ 13,946.85 | 55 | 1.9% | $ 13,681.86 | | 10 | 2% | | 55 | 1.9% |

D8 = LOOKUP(C8,J$8:K$17,2)

```
                EXAMPLE INTERMEDIATE REPRESENTATION
 400
  1   {
  2       initialPeriodFormulas{
  3           "Age" : stack [ CUSTOMER_DATA_REFERENCE["Age"] ],
  4           "Account Value" : stack [
  5               CUSTOMER_DATA_REFERENCE["Account Value"] ],
  6           "Account Value After Mortality" : stack [
  7               INITIAL_PERIOD_REFERENCE["Account Value"] ],
  8       }
  9       subsequentPeriodFormulas{
 10           "Account Value": stack [
 11               PREVIOUS_PERIOD_REFERENCE["Account Value After Mortality"] ],
 12           "Age" : stack [ ADD, PREVIOUS_PERIOD_REFERENCE["Age"], 1 ],
 13           "Death Rate" : stack [
 14               VLOOKUP,
 15               CURRENT_PERIOD_REFERENCE["Age"],
 16               TABLE_REFERENCE["MortalityTable"]
 17           ],
 18           "Account Value After Mortality" : stack [
 19               MINUS,
 20               CURRENT_PERIOD_REFERENCE["Account Value"],
 21               MULTIPLY,
 22               CURRENT_PERIOD_REFERENCE["Account Value"],
 23               CURRENT_PERIOD_REFERENCE["Death Rate"]
 24           ]
 25       }
 26       customerDataFieldNames: [ "Age", "Account Value" ]
 27       customerDataFieldNames: [ "Account Value After Mortality" ]
 28       tableData: {
 29           VerticalTable {
 30               name : "MortalityTable",
 31               rowLabels : 45,46,47,48,49,50,51,52,53,54,55
 32               data:  1%, 1.1%, 1.2%, 1.3%, 1.4%, 1.4%,
 33                      1.5%, 1.5%, 1.5%, 1.7%, 1.8%, 1.9%
 34           }
 35       }
 36       output: [ "Account Value After Mortality" ]
 37   }
```

*FIG. 4*

| 500 | PSEUDOCODE LISTING ONE |
|---|---|
| 1 | parseSheet(InputSheet sheet){ |
| 2 |    customerDataFieldNames = parseCustomerDataFieldNames(sheet); |
| 3 |    periodFormulaFieldNames = parsePeriodFormulaFieldNames(sheet); |
| 4 |    Output outputDataStructure = initiatizeOutputDataStructure(); |
| 5 |    for ( each OutputField f in outputDataStructure ){ |
| 6 |      parseField ( f, INITIAL_PERIOD, outputDataStructure ); |
| 7 |      parseField ( f, PERIOD_ONE,outputDataStructure ); |
| 8 |    } |
| 9 | } |

| 502 | PSEUDOCODE LISTING TWO |
|---|---|
| 1 | parseField( FieldName fieldName, Period p, Output output ): |
| 2 |    if ( o.contains( fieldName, p ) ){ |
| 3 |      return; |
| 4 |    } |
| 5 |    formulaString = getRawData( fieldName,p ); |
| 6 |    formulaStack = parseIntoStack( formulaString ); |
| 7 |    for (each element e in formulaStack){ |
| 8 |      convertedFormulaStack.put( convert( e, output ) ); |
| 9 |    } |
| 10 |    output.put( fieldname, p, formulaStack ); |
| 11 |    for ( each Reference r in convertedFormulaStack ){ |
| 12 |      parse( r.referencedField, r.period ); |
| 13 |    } |
| 14 | } |

*FIG. 5*

PSEUDOCODE LISTING THREE

```
 0  convertFormulaElement(FormulaElement e, Output output){
 1      switch ( e ) {
 2          case ( e is numeric ):
 3              return e;
 4          case ( e is an arithmetic operator ):
 5              return e;
 6          case ( e is an absolute reference to initial period ):
 7              return INITIAL_PERIOD_REFERENCE( getFieldName( e ) );
 8          case ( e refers to the current period ):
 9              return CURRENT_PERIOD_REFERENCE( getFieldName( e ) );
10          case ( e is relative ref to previous period ):
11              return PREVIOUS_PERIOD_REFERENCE( getFieldName( e ) );
12          case ( e refers to customer data ):
13              return CUSTOMER_DATA_REFERENCE( getFieldName( e ) );
14          case ( e refers to scenario data ):
15              return SCENARIO_DATA_REFERENCE();
16          case ( e is VLOOKUP):
17              newTableData = createTableData(e.getVlookupRange());
18              output.put(newTableData);
19              return TABLE_REFERENCE(e.getVlookupRange());
20      }
21  }
```

EXAMPLE STRINGTEMPLATE FILE

<u>700</u>

```
1  $defineCustomerDataStruct()$
2  $defineOutputStruct()$
3
4  void runSimulation(struct CustomerData* customerData, struct Output* output){
5
6    // Determine constants
7    $defineNamedConstantsStruct()$
8
9    // Define period values structure
10   $definePeriodValuesStruct()$
11
12   // Set up previous/initial period structure
13   $definePreviousAndInitialPeriodStruct()$
14
15   //main loop
16   for (int period = 1; period <= 100; ++period){
17     $templateInput.periodFormulas:defineCurrentPeriodFormula(); separator="\n"$
18     $templateInput.output:updateOutputVariable(); separator="\n"$
19     $templateInput.previousPeriodVariables:updatePreviousPeriodVariables(); separator="\n"$
20   }
21 }
```

*FIG. 7*

| 800 | EXAMPLE GENERATED C CODE |
|---|---|

```
1    struct CustomerData {
2        double Age;
3        double AccountValue; };
4
5    struct Output{
6        double AccountValueAfterMortality };;
7
8    void runSimulation(struct CustomerData* customerData, struct Output* output){
9        // Determine constants
10       Map<int,double> MortalityTable = {
11           45 : 0.01, 46 : .011, 47 : .012, 48 : .013, 49 : .014,
12           50 : .014, 51 : .015, 52 : .015, 53 : .015, 54 : .017,
13           55 : .018, 56 : .019  };
14
15       // Define period values structure
16       struct PeriodValues {
17               double AccountValue;
18               double Age;
19               double DeathRate;
20               double AccountValueAfterMortality; };
21
22       // Set up previous period and initial period strucutres
23       struct PeriodValues initialPeriodValues = { 0 };
24       initialPeriodValues.Age = customerData->Age;
25       initialPeriodValues.AccountValue = customerData->AccountValue;
26       initialPeriodValues.AccountValueAfterMortality = initialPeriodValues.AccountValue;
27       struct PeriodValues previousPeriodValues = initialPeriodValues;
28
29       // Main loop
30       for (int period = 1; period <= 100; ++period){
31           // compute current period values
32           struct PeriodValues currentPeriodValues = { 0 };
33           currentPeriodValues.Age = previousPeriodValues.Age + 1;
34           currentPeriodValues.AccountValue = previousPeriodValues.AccountValue;
35           currentPeriodValues.DeathRate = MortalityTable[currentPeriodValues.Age];
36           currentPeriodValues.AccountValueAfterMortality =
                     currentPeriodValues.AccountValue –
                         ( currentPeriodValues.DeathRate *
                         currentPeriodValues.AccountValue );
37
38           // copy results to Output
39           Output->AccountValueAfterMortality = currentPeriodValues.AccountValueAfterMortality;
40
41           // update previous period value struct for next iteration
42           previousPeriodValues = currentPeriodValues;
43       }
44   }
```

CODE GENERATION BASED ON SPREADSHEET DATA MODELS

BACKGROUND

Financial services companies frequently employ actuaries who, among other tasks, develop models that may be used to predict future market conditions and how their companies' product may fare in the future market conditions. Based on a model developed by their actuaries, a financial services company can determine what products to offer, how products should be priced, and also determine steps that may be taken to hedge risks related to existing products.

Actuarial modeling is used for many financial products, including products such as annuity contracts. An annuity contract may provide for an initial premium to be paid by a contract owner to an insurance company. The annuity contract may describe an accumulation phase, during which the annuity has an account value. In a fixed annuity contract, the insurance company may credit a market rate, generally determined on a periodic basis, to the account value. The account value increases during the accumulation phase in accordance with this periodically determined interest rate. In a variable annuity contract, during the accumulation phase, the contract owner has the right to allocate funds making up the account value to one or more subaccounts. Each subaccount may have a rate of return based on the rate of return of an investment fund selected by the contract owner. The available investment funds may include a wide range of available mutual funds, such as stock mutual funds with various investment guidelines, fixed income mutual funds, exchange traded funds, and other types of funds. The portion of the account value allocated to each fund varies along with the performance of the fund, so that the account value may both increase and decrease. Thus, the account value of the contract may be affected (both positively and negatively) by market conditions.

During the accumulation phase, the contract owner may elect to annuitize the value of the account. This converts the value of the account to an annuity that pays a periodic amount, generally for the lifetime of the contract owner. When the account is annuitized, the accumulation phase is concluded, and the account no longer has an account value. Many annuity contracts provide that, if the contract owner dies during the accumulation phase, the value of the account is paid to a beneficiary as a death benefit. Further, some annuity contracts may be associated with other benefits, such as a guaranteed minimum withdrawal benefit (GMWB), a guaranteed minimum income benefit (GMIB), or other type of benefit. According to a GMWB, the contract owner is permitted to withdraw the entire value of the premium on a periodic basis, without annuitizing the annuity, regardless of fluctuations in account value. For example, if a contract owner initially paid a premium of $200,000, but due to market conditions, their account value is only worth $150,000, the contract owner may still withdraw a percentage of the initial premium value on a periodic basis (e.g., once per year) until the entire value of the initial premium (in this example, $200,000) is recovered. According to a GMIB, the insurance company that is party to the annuity guarantees a minimum level of annuity payments, regardless of fluctuations in the account value.

Currently, actuaries frequently use spreadsheet applications (such as Microsoft Excel) to develop their models for annuity contracts and other products. These spreadsheet applications are user-friendly and intuitive, and can be used effectively by actuaries to develop models. However, these models can be very large in scope, and include very large amounts of data. Additionally, spreadsheet programs typically are general-purpose programs, and not optimized to run simulations based on models such as these. Therefore, simulations of these models as defined in spreadsheet programs can require prohibitively long periods of time (potentially hours or days) to execute. One current approach to address these issues includes employing software developers to program optimized, specific-purpose programs based on spreadsheet models defined by actuaries. While this approach results in faster models in some instances, it introduces a number of other issues. For example, writing the specific-purpose programs can be challenging, because domain-specific knowledge on the part of the developers is required. Further, errors can be introduced into the specific-purpose programs by developers during development, such that the specific-purpose programs do not accurately reflect the models defined by the actuaries. Additionally, the process of developing specific-purpose programs to reflect complex models can be very time-consuming. Therefore, new technologies that address the above-mentioned shortcomings of the current approaches to modeling financial products would be advantageous.

SUMMARY

A financial modeling system may include at least one data storage device and at least one processor. The at least one processor may be configured to store a spreadsheet data structure in the at least one data storage device that that describes a variable annuity contract between a customer and a financial services company. The spreadsheet data structure may include a first formula for determining a value associated with the variable annuity contract during a first time period, and a second formula for determining the value associated with the variable annuity contract during a second time period, wherein the second time period is subsequent to the first time period, and wherein the second formula is based on an output of the first formula. The at least one processor may be further configured to generate an intermediate representation of the spreadsheet data structure based on the first formula and the second formula. The intermediate representation may include information that describes how the value associated with the variable annuity contract is determined during the first time period and the second time period. The at least one processor may be further configured to generate software code based on the information from the intermediate representation, wherein the compilable software code includes one or more instructions for determining the value associated with the variable annuity contract during the first time period and the second time period.

A computer-implemented method for financial modeling may include storing a spreadsheet data structure that that describes a financial product held by a customer in at least one data storage device. The spreadsheet data structure may include a first formula for determining a value associated with the financial product during a first time period, and a second formula for determining the value associated with the financial product during a second time period, wherein the second time period is subsequent to the first time period, and wherein the second formula is based on an output of the first formula. The method may further include at least one processor generating an intermediate representation of the spreadsheet data structure based on the first formula and the second formula. The intermediate representation may include information that describes how the value associated with the financial product is determined during the first time period and the second time period. The method may further include the at least one processor generating compilable software code based on the information from the intermediate representation. The software code may include one or more instructions for determining the value associated with the financial product during the first time period and the second time period. The method may further include the at least one processor compiling the compilable software code, and the at least one processor executing the compiled software code to obtain results data. The results data includes the value associated with the financial product during the first time period and the second time period. The method may further include storing the results data in the at least one data storage device.

A computer-readable medium having processor-executable instructions stored thereon which, when executed by at least one processor, will cause the at least one processor to perform a method for financial modeling. The method may include storing a spreadsheet data structure that that describes a financial product held by a customer in at least one data storage device. The method may further include generating an intermediate representation of the spreadsheet data structure. The intermediate representation may include information that indicates a first formula for determining a value associated with the financial product during a first time period, and a second formula for determining the value associated with the financial product during a second time period, wherein the second time period is subsequent to the first time period, and wherein the second formula is based on an output of the first formula. The method may further include generating compilable software code based on the information from the intermediate representation, wherein the compilable software code includes one or more instructions for determining the value associated with the financial product during the first time period and the second time period.

BRIEF DESCRIPTION OF THE DRAWINGS

A more detailed understanding may be had from the following description, given by way of example in conjunction with the accompanying drawings wherein:

FIGS. 3A-3E show an example spreadsheet data structure that represents an example variable annuity contract;

FIG. 4 shows an example intermediate representation that may be generated based on the variable annuity model of FIGS. 3A-3E;

FIGS. 5-6 shows psuedocode listings that include code that may be used to generate an intermediate representation;

FIG. 7 shows an example StringTemplate file that may be used to generate software code based on the example intermediate representation of FIG. 4;

FIG. 8 shows an example code listing that may be generated based on the example intermediate representation of FIG. 4.

DETAILED DESCRIPTION

Disclosed herein are processor-executable methods, computing systems, and related technologies for the generation and execution of financial models. A financial model, such as a model of the value of a number of variable annuity products over time, may be created using a spreadsheet application. An intermediate data structure (an "intermediate representation") may be generated based on the financial model, and software code may be generated based on the intermediate representation. The software code may then be compiled and executed. When the compiled code is executed, it may produce the same result as would be produced by the original financial model in the spreadsheet application. However, execution of the compiled model may be, in many instances, faster than execution of the model in its corresponding spreadsheet form. Additionally, because the software code may be generated in a processor-executable method, the software code may be generated more efficiently and accurately than in a traditional approach whereby software code that represents the original model is generated by software developers.

Figure 1:
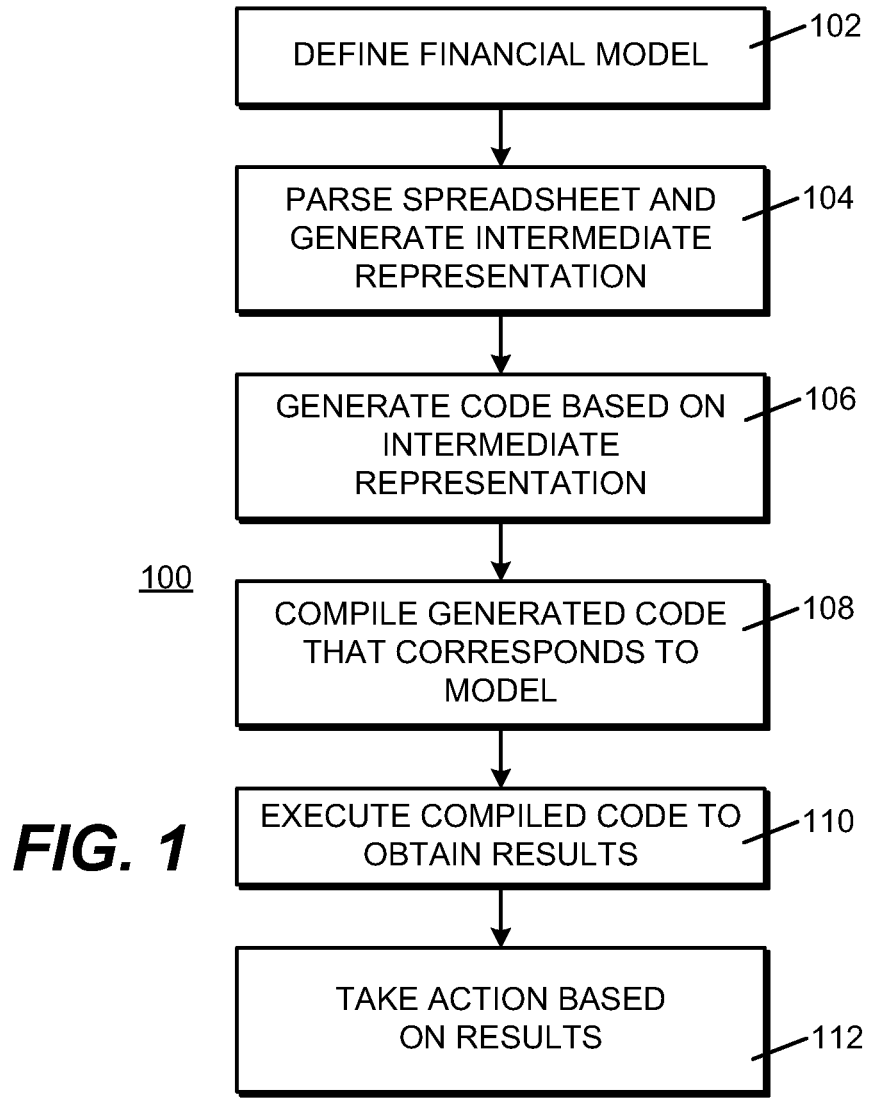
FIG. 1 shows a computer-implemented method for generating and executing a financial model.

FIG. 1 shows a computer-implemented method 100 for generating and executing a financial model. As will be described in further detail below, the method 100 of FIG. 1 may include storing a spreadsheet that describes a financial model, such as a model of the value of a number of variable annuity products over time based on one or more input variables. The method 100 of FIG. 1 may also include generating an intermediate representation based on the spreadsheet, and then generating compilable software code based on the intermediate representation. The method 100 of FIG. 1 may also include compiling and executing the compilable software code. Using the method of FIG. 1, the model described in the original spreadsheet may be converted into the software code, compiled, and executed. The method 100 of FIG. 1, as will be described in further detail below, may be implemented using an architecture such as the example logical architecture 200 of FIG. 2.

Figure 2:
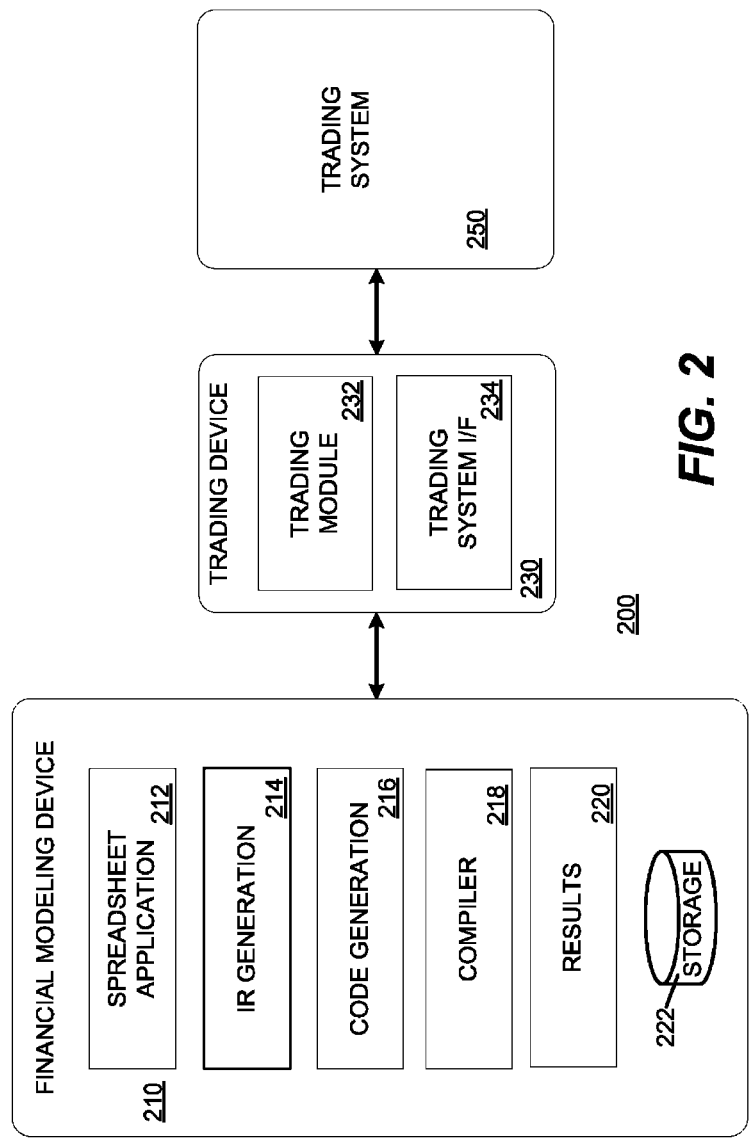
FIG. 2 shows an example logical architecture for generating an executing a financial model.

The example architecture of FIG. 2 includes a financial modeling device 210, a trading device 230, and a trading system 250. The financial modeling device 210, trading device 230, and trading system 250 may be connected via one or more wired and/or wireless communication networks (not depicted). The financial modeling device 210 may include a spreadsheet application module 212, an intermediate representation (IR) generation module 214, a code generation module 216, a compiler module 218, a results module 220, and data storage device 222. The trading device 230 may include a trading module 232 and a trading system interface module 234. Each or any combination of the modules 212, 214, 216, 218, 220, 232, 234 shown in FIG. 2 may be implemented as software modules, specific-purpose processor elements, or as combinations thereof. Suitable software modules include, by way of example, an executable program, a function, a method call, a procedure, a routine or sub-routine, one or more processor-executable instructions, an object, or a data structure.

The spreadsheet application module 212 in the financial modeling device 210 may be or include, for example, a software application such as Microsoft Excel, Apple Numbers, OpenOffice.org Calc, Gnumeric, or any other appropriate spreadsheet application. The spreadsheet application module 212 may display spreadsheet data via one or more display devices (not depicted) that are coupled to and/or included within the financial modeling device 210, and may receive input from a user of the financial modeling device 210 for modifying, deleting, and/or adding spreadsheet data. The IR generation module 214, as will be described in further detail below, may generate an intermediate representation based on financial models handled by the spreadsheet application module 212. The code generation module 216, also as will be described in further detail below, may generate software code based on an intermediate representation generated by the IR generation module 214. The compiler module 218 may compile the software code generated by the code generation module 216. Compiling the software code may include converting the software code into object code, one or more processor executable instructions, and/or a processor-executable program.

The results module 220 may, for example, execute the compiled software code. Executing the compiled code may include determining sets of input parameters to use for executing the compiled code, and then executing the compiled code once per each set of input parameters, thereby obtaining a set of model results. The results module 220 may also take one or more actions based on the model results. For example, the results module 220 may display the model results via the one or more display devices that are coupled to and/or included within the financial modeling device 210, store the results in the data storage device 222, and/or communicate the model results to the trading module 232 in the trading device 230.

The data storage device 222 in the financial modeling device 210 may be or include a hard disk, a magneto-optical medium, an optical medium such as a CD-ROM, or other type of device for electronic data storage. Each or any of combination of the modules 212, 214, 216, 218, 220 in the financial modeling device 210 may storage data in and/or access data from the data storage device 222.

The trading system 250 may be, for example, an Electronic Communication Network (ECN), an electronic trading platform, and/or any other type of electronic system for performing transactions such as the sale or purchase of stocks, bonds, options, and/or any other type of financial instrument. As described above, the trading device 230 may receive information such as results of a model executed by the results module 220. In such an instance, the trading module 232 in the trading device 230 may determine that one or more financial transactions should be performed, based on the results. The trading system interface may 234 then send one or more messages to the trading system 250 to execute the transaction. The trading system interface may 234 communicate with the trading system 250 using technology such as Secure Socket Layer (SSL) technology, the Financial Information eXchange (FIX) protocol, and/or any other appropriate technology.

In addition or as an alternative to the features of these modules described above with reference to FIG. 2, these modules 212, 214, 216, 218, 220, 232, 234 may perform functionality described herein with reference to FIG. 1 and/or FIGS. 3A-9.

Referring again to FIG. 1, the method 100 of FIG. 1 may begin with defining a financial model (step 102). This may include, for example, the spreadsheet application module 212 storing and/or displaying a spreadsheet data structure that is a representation of the financial model as a spreadsheet. This may also include the spreadsheet application module 212 displaying a user interface that shows data in the spreadsheet data structure, and/or receiving user input for defining the spreadsheet data structure. The financial model may represent, for example, how the value of financial instruments may change over time due to one or more input variables. The financial instruments may include, for example, variable annuity contracts, life insurance contracts, or any other types of financial instrument. Alternatively or additionally, the financial instruments may include any financial instruments that may be modeled using stochastic modeling, probabilistic modeling, and/or Monte Carlo modeling techniques.

The financial model (i.e., the spreadsheet data structure) may include one or more sheets. Each sheet may be defined a two-dimensional grid that is made up of cells. Each cell in the sheet may be assigned a value, and may be assigned to a coordinate location (column, row) in the grid. A cell may be referred to based on which coordinate location it corresponds to. For example, in a sheet where columns are labeled with letter values (e.g., the sheet includes columns A through Z) and where rows are labeled with number values (e.g., the sheet includes row one through twenty), the cell "A1" would be in column A and row one. Similarly, the cell B2 would be in (column B, row two); the cell C3 would be in (column C, row three); and so on. A cell may have a numeric or text value. For example, a cell may be assigned to a text value of "Age." Additionally, the value of a cell may be a reference to another cell. In such an instance, the value of the referring cell is considered to be the same as the value of the cell to which reference is made. For example, if cell A3 is assigned to a numeric value of five and cell A4 is set to be a reference to A3, then the value of A4 may be considered to be five. Further, the value of a cell may be assigned to be a formula that includes one or more arithmetic or other operations. For example, a cell may be assigned to be equal to the product of two numeric values. Further, a cell value may be assigned as a value that includes a combination of multiple types of values. For example, a cell might be assigned to be the product of the values of references to two other cells. As one example of this, a cell A4 may be assigned to be the product of the values of cells A5 and A6. Such an assignment could be represented using the following notation: "A4=A5*A6".

Areas in a sheet in the model may correspond to different types of data. For example, a first area in a sheet may include data that is input data to the model, while a second area in the sheet includes cells that include formulas that perform describe calculations based on the input data, and a third area in the sheet may include data that indicates the output of the model (i.e., results of the calculations). An example sheet in an example model is described in detail below with reference to FIGS. 3A-3E.

FIGS. 3A-3E show a user interface window 300 that shows a sheet in an example financial model that represents a variable annuity contract. The window 300 may be displayed, for example, by the spreadsheet application nodule 212 of FIG. 2. The window 300 may show a number of areas in the model, including a customer data area 302, a financial model area 304, a market scenario area 306, and a mortality table area 308. The customer data area 302 may include data that describes characteristics of the customer who is a party to the variable annuity contract.

The variable annuity model shown in FIGS. 3A-3E may also include a financial model area 304, which includes information that describes the account value and other information related to the contract. As will be described in further detail below, the financial model area 304 includes information that describes the account value for the contract over time, based on a number of input variables and other factors. In row seven, for example, the financial model area 304 includes cells (A7 through E7) that describe the contract during an initial time period (i.e., the beginning time period for simulating the model); in row eight, the financial model area 304 includes cells (A8 through E8) that describe the contract during a subsequent time period (the year following the initial time period); in row nine, the financial model area 304 includes cells (A9 through E9) that describe the contract during a further subsequent time period (the year that is two years after the initial time period); and so on. The values for the cells in column E within the financial model area 304 (i.e., cells E7 through E17) may be considered to be the output of the model. Alternatively, a different set of the cells in column E may be considered to be the output of the model. As one alternative, the output may be considered to be cells E8 through E17. As another alternative, the output may be considered to be a single value, such as the value of the last cell in column E (e.g., cell E17).

The variable annuity model shown in FIGS. 3A-3E may also include information that describes market conditions over time. As will be described in further detail below, cells in the market scenario area 306 are referred to by cells in the financial model area 304; the cells in the market scenario area 306 are thereby used as inputs to formulas in cells in the financial model area 304 that describe the account value for the contract over time. The mortality table area 308 includes information that defines a death rate (i.e., the probability that the customer to the contract will die), based on the age of the customer. As with the cells in the market scenario area 306, the cells in the mortality table area 308 are used as inputs to formulas in cells in the financial model area 304.

Figure 3B:
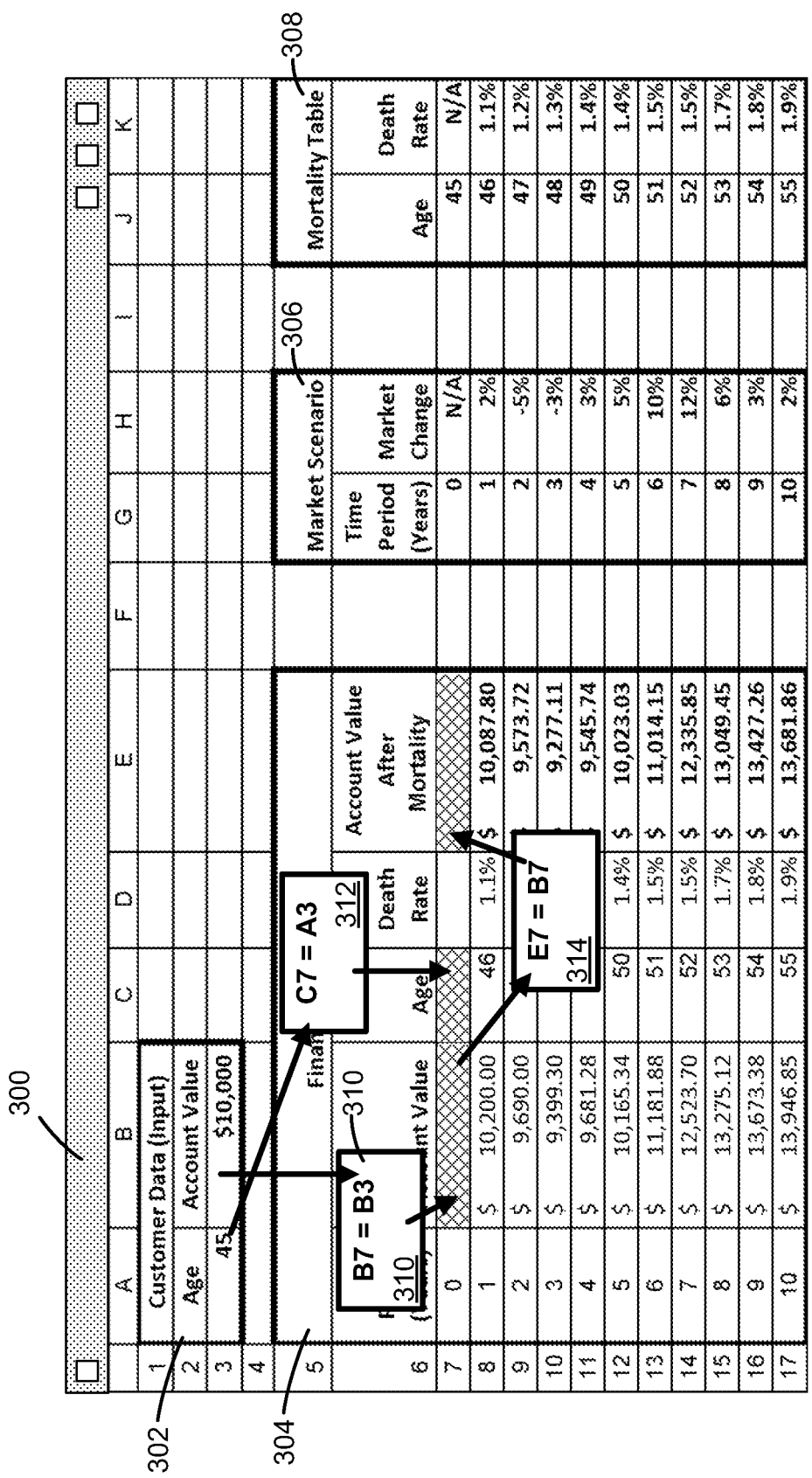

FIG. 3B shows a second view of the window 300, wherein a number of cell values are shown in further detail. More specifically, FIG. 3B shows how values for a number of cells in row seven in the financial model area 304 (which corresponds to the initial time period in the model) may be defined. In a first formula area 310 in the window 300, it is shown that the value for cell B7 (which corresponds to the account value at the initial time period) is based on the value in cell B3. In a second formula area, it is shown that the value for cell E7 (which corresponds to a potential account value after a probability of mortality is factored in) is based on the value from cell B7. And in a third formula area 314, it is shown that the value for cell C7 (which corresponds to the age of the customer) is based on the value from cell A3.

Figure 3E:
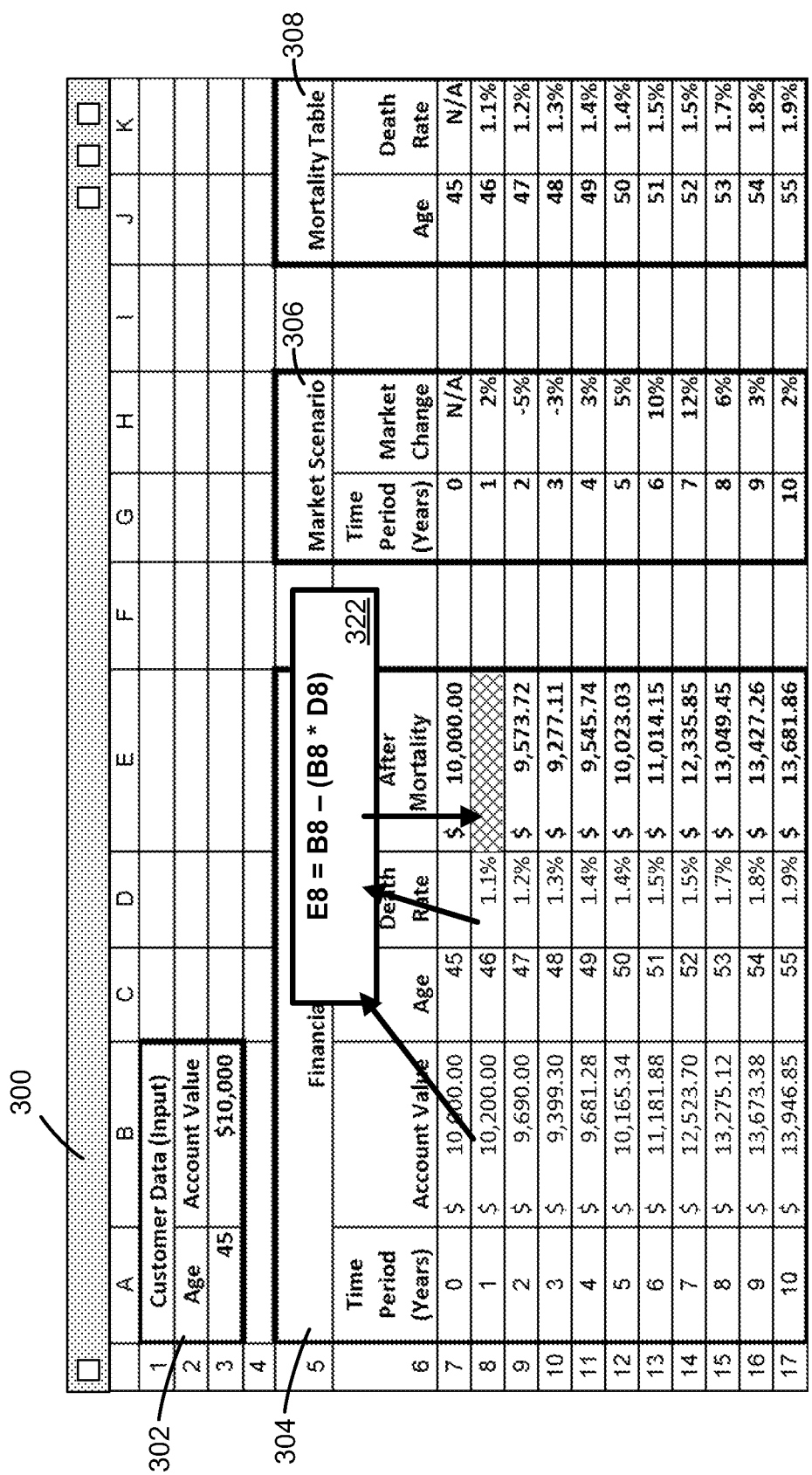

FIGS. 3C-3E shows additional views of the window 300, wherein a number of cell values are shown in further detail. More specifically, FIGS. 3C-3E show how values for a numbers of cells in row eight in the financial model area 304 (which corresponds to the year following the initial time period) may be defined. FIG. 3C, for example, shows a third view of the window 300, wherein additional cell values are shown in further detail. In a fourth formula area 316, it is shown that the value for cell B8 is based on values from cells E7 and H8, according to the following formula: B8=E7*(100%+H8). In a fourth formula area 318, it is shown that the value for cell C8 is based on the value from cell C7, according to the following formula: C8=C7+1.

FIG. 3D shows a fourth view of the window 300, wherein an additional cell value is shown in further detail. In a fifth formula area 320, it is shown that the value for cell D8 is based on a LOOKUP function which takes three input parameters. The first input parameter shown in the fifth formula area 320 is "D8," which is referred to as the "value" parameter. The second input parameter is "J$8:K$17," which is referred to as the "tableArray" parameter, and which is a reference to a table of two or more columns of data that are sorted in ascending order. The third parameter is "2," which is referred to as the "indexNumber" parameter. The LOOKUP function operates as follows: As mentioned above, the "tableArray" parameter refers to a table of two or more columns of data. The "value" parameter indicates a value to search for in the first column of the table indicated by the "tableArray" parameter. The "indexNumber" parameter indicates the column number in the table indicated by the "tableArray" from which the value that matches the "value" parameter should be returned. According to the example shown in the fifth formula area 320, the value parameter is forty-six. Cell J8, which is within the table indicated by the "tableArray" parameter, also has a value of forty-six. The "indexNumber" parameter has a value of two, indicating that the second column in the table indicated by the "tableArray" parameter (i.e., column K) is the table from which the value should be returned. Therefore, the LOOKUP formula in the example of the fifth formula area 320 returns the value found in cell K8, which is "1.1%."

FIG. 3E shows a fifth view of the window 300, wherein an additional cell value is shown in further detail. In a sixth formula area 322, it is shown that the value of cell E8 is based on the values of B8 and D8, according to the following formula: E8=B8−(B8*D8).

As noted above, FIG. 3B shows how values for a number of cells in row seven in the financial model area 308 may be defined, while FIGS. 3C-3E show how values for a number of cells in row eight in the financial model area 308 may be defined. Further to the example of FIGS. 3A-3E, the values for subsequent rows in the financial model area 308 (i.e., rows below row eight) may be defined in a similar fashion as those described above with reference to row eight, but modified according to their respective distances from row eight. For example, as mentioned above, the value for cell C8 is defined according to the following formula: C8=C7+1. Similarly, values for subsequent cells in column C would be defined as follows: C9=C8+1; C10=C9+1; C11=C10+1; and so on. As a further example, cell B8, as mentioned above, may be defined according to the following formula: B8=E7*(100%+H8). Similarly, values for subsequent cells in column B would be defined as follows: B9=E8*(100%+H9); B10=E9*(100%+H10); and so on. Further, the cells in columns D and E subsequent to row eight within the financial model area 308 may be defined in a similar fashion.

As shown in FIGS. 3A-3E, a financial model may include information such as an initial customer age, an initial account value, market condition information, mortality probability information, and information that indicates an account value after the probability of mortality is taken into account. Alternatively or additionally, a financial model may include information such as information that indicates an account value after withdrawals (e.g., GMWB withdrawals, or any other type of withdrawals) are taken out. Further, while the example model shown in FIGS. 3A-3B relates to a single contract, multiple contracts may be aggregated into a single aggregated group of contracts. In such an instance, a model may include information for the group of contracts such as customer ages, an initial aggregate or average account value, market condition information, mortality probability information, information that indicates an aggregate or average account value after the probability of mortality of the customers is taken into account, and/or information that indicates an aggregate or average account value after withdrawals (e.g., GMWB withdrawals, or any other type of withdrawals) are taken out. Alternatively or additionally, while FIGS. 3A-3E show that the result of the example financial model include information that indicates one or more account values, the features described herein may be used, mutatis mutandis, with any other type of results data. For example, results data may include data such as information that indicates fees taken by the financial services company that is party to the modeled financial instrument(s), withdrawals taken by the contract owner(s), and/or any other appropriate type of data that reflects the state of the modeled financial instrument(s) and/or the state of the parties to the financial instrument(s).

Referring again to FIG. 1, after the financial model is defined (step 102), the model may be parsed and an intermediate representation may be generated (step 104). This may be performed by, for example, the IR generation module 214 of FIG. 2.

FIG. 4 shows an example intermediate representation 400 that may be generated in this step (step 104) based on the variable annuity model of FIGS. 3A-3E. As shown in FIG. 4, the example intermediate representation 400 may include an initialPeriodFormulas parameter (lines two through eight) that may include information that describes formulas that are in the row in the financial model area 304 that corresponds to the initial time period in the variable annuity model (i.e., row seven). Similarly, the subsequentPeriodFormulas parameter (lines nine though twenty-five) may include information that describes formulas that are in the row in the financial model area 304 that corresponds to the time period subsequent to the initial time period in the model (i.e., row eight). The customerDataFieldNames parameter may store information that indicates the names of fields in the customer data area 302 that have corresponding values that appear in the row in the financial model area 304 that corresponds to the initial time period in the variable annuity model (i.e., row seven). The tableData parameter may include information that describes the tables indicated in the mortality table area 308.

To generate the intermediate representation 400 of FIG. 4, the IR generation module 214 may perform one or more of the following actions: The IR generation module 214 may determine which areas in variable annuity model correspond to which types of data. This may include determining the boundaries of the customer data area 302, the financial model area 304, the market scenario area 306, and the mortality table area 308. This may be performed by, for example, the IR generation module 214 reading in a file from the data storage device 222 that includes cell ranges for the different regions. In such an instance, the file may include text such as "customerData=A2:B3" to represent the boundaries of the customer data area 302, text such as "financialModel=A6:E17" to represent the boundaries of the financial model area 304, and text such as "output=E7:E17" to represent the boundaries of the output cells, and so on. Alternatively or additionally, the spreadsheet model itself may include data that indicates the boundaries, using a feature such as Excel's "Named Ranges" feature, or any other appropriate approach.

Alternatively or additionally, to generate the intermediate representation 400 of FIG. 4, the IR generation module 214 may perform one or more of the following actions: The IR generation module 214 may determine which cells in the model are output cells in the row in the financial model area 304 that corresponds to the initial time period in the variable annuity model (i.e., row seven), as well as determine which cells are output cells in the time period subsequent to the initial time period in the model (i.e., row eight). Starting with these cells, the IR generation module 214 may, using one or more recursive functions, generate the above-listed example intermediate representation. This may include recursively following cell references from the output cells until the recursion terminates, and data corresponding to every cell in the model that is linked to from the output cells has been added to the intermediate representation.

Further examples of how the IR generation module 214 may generate the intermediate representation 400 of FIG. 4 are shown in FIG. 5 and FIG. 6. FIG. 5 includes Pseudocode Listing One 500, which shows a C-style pseudocode function that may be used by the IR generation module 214 to parse the variable annuity model of FIGS. 3A-3E and generate the intermediate representation 400 of FIG. 4. Pseudocode Listing One 500 includes a call to a parseField function, which is described in detail in Pseudocode Listing Two 502 of FIG. 5. The parseField function of Pseudocode Listing Two 502, in turn, includes a call to a convert function, which is described in detail in Pseudocode Listing Three 600 of FIG. 6.

Referring again to FIG. 2, generating the intermediate representation (step 104) may additionally include the IR generation module 214 storing the generated model in the data storage device 222, and/or displaying the generated model on the one or one or more display devices that are coupled to and/or included within the financial modeling device 210.

After the intermediate representation is generated, software code may be generated based on the intermediate representation (step 106). This may be performed, for example, by the code generation module 216 of FIG. 2. The software code may be, for example, code that is defined according to a high-level language such as C, C++, Java, C#, Visual Basic, or any other appropriate software language. Alternatively or additionally, the software code may be code that is defined according to a language that is and/or may be used with General Purpose Computing On Graphics Processing Units (GPGPU) technology. Examples of GPGPU technology include Close to Metal (CTM), Compute Unified Device Architecture (CUDA), Open Computing Language (OpenCL), and DirectCompute/High Level Shader Language (HLSL).

A number of different approaches may be employed to generate software code based on the intermediate representation (step 106). As one example, a template processor technology may be used. A template processor is a software component that is designed to combine one or more templates with a data model to produce a document. One example of a template processing technology that may be used to generate software code based on the intermediate representation is StringTemplate. FIG. 7 shows the contents of an example StringTemplate file 700 that may be used to generate software code based on the example intermediate representation 400 of FIG. 4. Alternatively or additionally, any number of different approaches may be employed to generate software code based on a single instance of a intermediate representation. As one example, multiple users may want to execute the same model, and first user may favor GPGPU technology, while a second user does not; in such an instance, GPGPU code (as one example, code that includes the use of CUDA technology) may be generated from an intermediate representation for the first user, while corresponding non-GPGU C code could be generated for the second user from the same intermediate representation.

FIG. 8 shows an example code listing 800 that may be generated based on the example intermediate representation 400 of FIG. 4 (step 106). The example code listing 800 may be generated using the StringTemplate file 700 shown in FIG. 7, or via a code generation and/or template processing technology, and/or any other appropriate technology. As shown in FIG. 8, the runSimulation function (lines eight through forty-three of the example code listing 800), describe instructions which, when executed by a processor, will generate output values that correspond to the output cells shown in FIGS. 3A-3E.

After software code is generated based on the intermediate representation, the generated software code may be compiled (step 108). This may be performed by, for example, the compiler module 218. The compiler module 218 may be a compiler application that corresponds to the language in which the software code is generated. For example, if the generated software code is C code, the compiler module 218 may be or include a C compiler. Compiling the software code may include converting the software code into object code, one or more processor executable instructions, and/or a processor-executable program. Alternatively or additionally, compiling the software code may include converting the software code into a format that is executable by a virtual machine. For example, in an instance where the generated software code is Java code, the compiler module 218 may generate Java bytecode based on the generated software code. Compiling the software code may additionally include the compiler module 218 storing the generated model in the data storage device 222, and/or displaying the generated model on the one or one or more display devices that are coupled to and/or included within the financial modeling device 210.

After the generated software code has been compiled, the compiled code may be executed (step 110). This may be performed by, for example, the results module 220 of FIG. 2. Executing the compiled code (step 110) may include executing the compiled code a number of times, using a number of different inputs. As one example, execution of the compiled code may include one or more of the following actions by the results module 220: The results module 220 may read in input data that is stored in the data storage device 222 in the financial modeling device 210. The input data may include a number of sets of input parameters, wherein each set of input parameters matches the parameters expected to be received by the compiled code. In such an instance, the results module 220 may execute the compiled code a number of times, once per set of input parameters. For example, referring again to FIG. 8, the code listing 800 of FIG. 8 shows a runSimulation function (lines eight to forty-three) that receives two variables as inputs: a customerData parameter, and an output parameter. Each execution of the runSimulation function generates a number of output values based on these two inputs. The results module 220 may read input data from the data storage device 222 that describes, as one example, fifty-five million different sets of customerData parameters. The results module 220 may then execute the compiled runSimulation function fifty-five million times, once per set of customerData parameters, thereby producing a set of results that includes output values for each set of input parameters. Execution of the compiled code may include executing the runSimulation function on many different sets of input parameters in parallel.

After the results are obtained, an action may be taken based on the results (step 112). This may include the results module 220 communicating the results to the trading module 232 in the trading device 230. In such an instance, the trading module 232 in the trading device 230 may determine that one or more financial transactions should be performed, based on the results. The financial transactions may include, for example, the purchase or sale of one or more financial instruments such as stocks, bonds, options, and/or any other type of financial instrument to offset the results. The trading system interface may 234 may then send one or more messages to the trading system 250 to execute the transactions.

Alternatively or additionally, taking an action based on the results (step 112) may include the results module 220 storing the results of execution in the data storage device 222, and/or displaying the results of execution on the one or one or more display devices that are coupled to and/or included within the financial modeling device 210.

Alternatively or additionally, in an instance where the method of FIG. 1 is performed at a financial services company, taking an action based on the results (step 112) may include increasing cash reserves of the company, re-evaluating product pricing, and/or otherwise taking appropriate action to hedge against the results.

Figure 9:
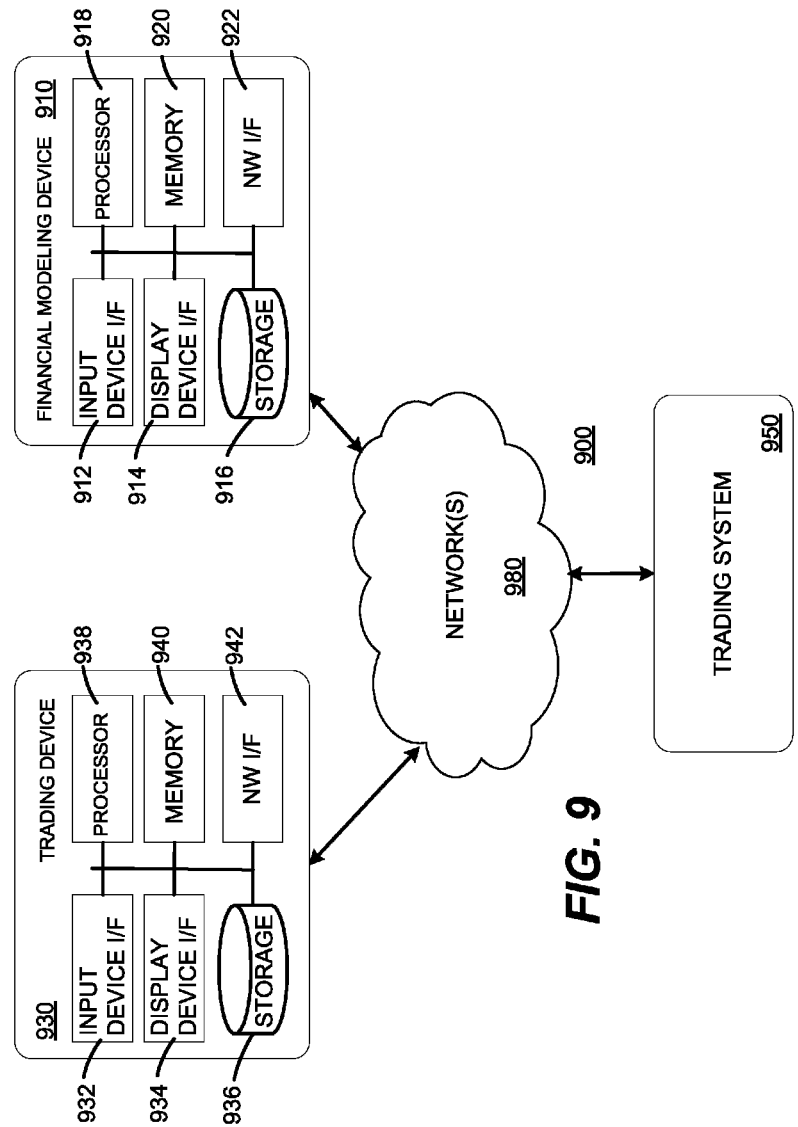
FIG. 9 shows an example system that may be used to implement features described herein with respect to FIGS. 1-8.

FIG. 9 shows an example system 900 that may be used to implement features described above with respect to FIGS. 1-8. The example system 900 includes a financial modeling device 910, a trading device 930, a trading system 950, and one or more networks 980.

The financial modeling device 910 may include at least one processor 918, a memory device 920, a network interface 922, an input device interface 912, a display device interface 914, and a data storage device 916. The trading device 930 may include at least one processor 938, a memory device 940, a network interface 942, an input device interface 932, a display device interface 934, and a data storage device 936.

The financial modeling device 910 may be configured to perform any feature or combination of features described above with reference to FIGS. 1-8 as performed by the spreadsheet application module 212, the IR generation module 214, the code generation module 216, the compiler module 218, and/or the results module 220. The trading device 930 may be configured to perform any feature or combination of features described above with reference to FIGS. 1-8 as performed by the trading module 232 and/or the trading system interface module 234. Each or any of the financial modeling device 910 and the trading device 930 may be, for example, a desktop computer, a laptop computer, a netbook, a tablet computer, a personal digital assistant (PDA), a cellular phone, or any other appropriate device.

Each or any of the memory devices 920, 940 may be or include a device such as a Dynamic Random Access Memory (D-RAM), Static RAM (S-RAM), or other RAM or a flash memory. Each or any of the storage devices 916, 936 may be or include a hard disk, a magneto-optical medium, an optical medium such as a CD-ROM, a digital versatile disk (DVDs), or Blu-Ray disc (BD), or other type of device for electronic data storage. The data storage device 916 in the financial modeling device 910 store the information or any subset of the information described above with reference to FIGS. 1-8 as stored in the data storage device 222 of FIG. 2 and/or as processed by one or any combination of the spreadsheet application module 212, the IR generation module 214, the code generation module 216, the compiler module 218, and/or the results module 220. The data storage device 936 in the trading device 930 may store the information or any subset of the information described above with reference to FIGS. 1-8 as processed by one or any combination of the trading module 232 and/or the trading system interface module 234.

Each or any of the network interfaces 922, 942 may be, for example, a communications port, a wired transceiver, or a wireless transceiver. Each or any of the network interfaces 922, 942 may be capable of communicating using technologies such as Ethernet, fiber optics, microwave, xDSL (Digital Subscriber Line), Wireless Local Area Network (WLAN) technology, wireless cellular technology, and/or any other appropriate technology. The network interfaces 922, 942 may be used by the financial modeling device 910 and/or the trading device 930 to communicate via the one or more networks 980. The network interface 922 in the financial modeling device 910 may be configured to communicate any of the messages and/or other information described above with reference to FIGS. 1-8 as communicated by the spreadsheet application module 212, the IR generation module 214, the code generation module 216, the compiler module 218, and/or the results module 220. The network interface 942 in the trading device 930 may be configured to communicate any of the messages and/or other information described above with reference to FIGS. 1-8 as communicated by the trading module 232 and/or the trading system interface module 234.

The one or more networks 980 may include one or more private networks and/or one or more public networks such as the Internet. The one or more networks 980 may be based on wired and/or wireless networking technologies.

The input device interface 912 in the financial modeling device 910 may be an interface configured to receive input from an input device such as a keyboard, a mouse, a trackball, a scanner, a touch screen, a touch pad, a stylus pad, and/or other device. The input device interface 912 may operate using a technology such as Universal Serial Bus (USB), PS/2, Bluetooth, infrared, and/or other appropriate technology. The input device interface 912 may be configured to receive any or any combination of the user input described above with reference to FIGS. 1-8 as received by the by the spreadsheet application module 212, the IR generation module 214, the code generation module 216, the compiler module 218, and/or the results module 220.

The display device interface 914 may be an interface configured to communicate data to a display device (not depicted). The display device interface 914 may operate using technology such as Video Graphics Array (VGA), Super VGA (S-VGA), Digital Visual Interface (DVI), High-Definition Multimedia Interface (HDMI), or other appropriate technology. The financial modeling device 910 may include or be couple to a display device (not depicted) via the display device interface 914. The display device may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device may be configured to display, based on data received from the input device interface 912, any display elements described above with reference to FIGS. 1-8 as displayed by the spreadsheet application module 212, the IR generation module 214, the code generation module 216, the compiler module 218, and/or the results module 220.

The trading system 950 may be, for example, an Electronic Communication Network (ECN), an electronic trading platform, and/or any other type of electronic system for performing transactions such as the sale or purchase of stocks, bonds, options, and/or any other type of financial instrument.

The memory device 920 and/or the data storage device 916 of the financial modeling device 910 may store instructions which, when executed by the at least one processor 918, cause the at least one processor 918 to perform any feature or combination of features described above with reference to FIGS. 1-8 as performed by the spreadsheet application module 212, the IR generation module 214, the code generation module 216, the compiler module 218, and/or the results module 220. The memory device 940 and/or the data storage device 936 of the trading device 930 may store instructions which, when executed by the at least one processor 938, cause the at least one processor 938 to perform any feature or combination of features described above with reference to FIGS. 1-8 as performed by the trading module 232 and/or the trading system interface module 234.

Although FIG. 9 shows a single financial modeling device 910 and a single trading device 930, the functionality described above with reference to FIG. 9 as performed by the financial modeling device 910 and the trading device 930 may be distributed across any number of devices that possesses similar characteristics and/or that include similar components 912, 914, 916, 918, 920, 922, 932, 934, 936, 938, 940, 942 as the financial modeling device 910 and the trading device 930.

As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although features and elements are described above in particular combinations, each feature or element can be used alone or in any combination with or without the other features and elements. For example, each feature or element as described above with reference to 1-9 may be used alone without the other features and elements or in various combinations with or without other features and elements. Sub-elements of the methods and features described above with reference to FIGS. 1-9 may be performed in any arbitrary order (including concurrently), in any combination or sub-combination.

What is claimed is:

1. A financial modeling system, the financial modeling system comprising:
   at least one data storage device; and
   at least one processor, the at least one processor configured:
      to store, in the at least one data storage device, a spreadsheet data structure that that describes a variable annuity contract between a customer and a financial services company, wherein the spreadsheet data structure includes:
         a first formula for determining a value associated with the variable annuity contract during a first time period;
         a second formula for determining the value associated with the variable annuity contract during a second time period, wherein the second time period is subsequent to the first time period, and wherein the second formula is based on an output of the first formula;
      to generate an intermediate representation of the spreadsheet data structure based on the first formula and the second formula, wherein the intermediate representation includes information that describes how the value associated with the variable annuity contract is determined during the first time period and the second time period; and
      to generate compilable software code based on the information from the intermediate representation, wherein the compilable software code includes one or more instructions for determining the value associated with the variable annuity contract during the first time period and the second time period.

2. The financial modeling system of claim 1, wherein the processor is further configured:
   to compile the compilable software code;
   to execute the compiled software code to obtain results data, wherein the results data includes the value associated with the variable annuity contract during the first time period and the second time period; and
   to store the results data in the at least one data storage device.

3. The financial modeling system of claim 1, wherein the value associated with the variable annuity contract includes: a dollar value of an account associated with the variable annuity contract; a dollar value of fees taken by the financial services company; or a dollar value of withdrawals taken by the customer.

4. The financial modeling system of claim 1, wherein the spreadsheet data structure further includes information that describes a change in market conditions, and wherein the second formula is further based on the information that describes the change in market conditions.

5. The financial modeling system of claim 1, wherein the first time period is an initial time period, and wherein the first formula is based on an age of the customer during the initial time period and the value associated with the variable annuity contract during the initial time period.

6. The financial modeling system of claim 1, wherein the spreadsheet data structure further includes death rate information that describe a probability of death of the customer, and wherein the second formula is further based on the death rate information.

7. The financial modeling system of claim 1, wherein the at least one processor is further configured to generate the intermediate representation of the spreadsheet data structure by:
   determining cells in the spreadsheet data structure that correspond to output data; and
   recursively parsing formulas from the cells in the spreadsheet data structure that correspond to the output data.

8. The financial modeling system of claim 1, wherein the compilable software code is defined according to one of: C; C++; Java; C#; or Visual Basic.

9. The financial modeling system of claim 1, wherein the compilable software code includes the use of one or more of: Close to Metal (CTM); Compute Unified Device Architecture (CUDA); Open Computing Language (OpenCL); or DirectCompute/High Level Shader Language (HLSL).

10. The financial modeling system of claim 9, wherein the at least one processor includes a Graphics Processing Unit (GPU).

11. A computer-implemented method for financial modeling, the method comprising:
   storing, in at least one data storage device, a spreadsheet data structure that that describes a financial product held by a customer, wherein the spreadsheet data structure includes:
      a first formula for determining a value associated with the financial product during a first time period;
      a second formula for determining the value associated with the financial product during a second time period, wherein the second time period is subsequent to the first time period, and wherein the second formula is based on an output of the first formula;
   at least one processor generating an intermediate representation of the spreadsheet data structure based on the first formula and the second formula, wherein the intermediate representation includes information that describes how the value associated with the financial product is determined during the first time period and the second time period;
   the at least one processor generating compilable software code based on the information from the intermediate representation, wherein the compilable software code includes one or more instructions for determining the value associated with the financial product during the first time period and the second time period;
   the at least one processor compiling the compilable software code;
   the at least one processor executing the compiled software code to obtain results data, wherein the results data includes the value associated with the financial product during the first time period and the second time period; and
   storing the results data in the at least one data storage device.

12. The method of claim 11, wherein the financial product is a variable annuity contract.

13. The method of claim 11, wherein the value associated with the financial product includes: a dollar value of an account associated with the financial product; a dollar value of fees taken by a financial services company associated with the financial product; or a dollar value of withdrawals taken by the customer.

14. The method of claim 11, wherein the spreadsheet data structure further includes information that describes a change in market conditions, and wherein the second formula is further based on the information that describes the change in market conditions.

15. The method of claim 11, wherein the first time period is an initial time period, and wherein the first formula is based on an age of the customer during the initial time period and the value associated with the financial product during the initial time period.

16. The method of claim 11, wherein the spreadsheet data structure further includes death rate information that describe a probability of death of the customer, and wherein the second formula is further based on the death rate information.

17. The method of claim 11, wherein the compilable software code is defined according to one of: C; C++; Java; C#; or Visual Basic.

18. The method of claim 11, wherein the compilable software code includes the use of one or more of: Close to Metal (CTM); Compute Unified Device Architecture (CUDA); Open Computing Language (OpenCL); or DirectCompute/High Level Shader Language (HLSL).

19. The method of claim 18, wherein the at least one processor includes a Graphics Processing Unit (GPU).

20. A computer-readable medium having processor-executable instructions stored thereon which, when executed by at least one processor, will cause the at least one processor to perform a method for financial modeling, the method comprising:
   storing, in at least one data storage device, a spreadsheet data structure that that describes a financial product held by a customer;
   generating an intermediate representation of the spreadsheet data structure, wherein the intermediate representation includes information that indicates:
      a first formula for determining a value associated with the financial product during a first time period;
      a second formula for determining the value associated with the financial product during a second time period, wherein the second time period is subsequent to the first time period, and wherein the second formula is based on an output of the first formula; and
   generating compilable software code based on the information from the intermediate representation, wherein the compilable software code includes one or more instructions for determining the value associated with the financial product during the first time period and the second time period.

21. The computer-readable medium of claim 20, wherein the method further comprises:
   compiling the compilable software code; and
   executing the compiled software code to obtain results data, wherein the results data includes the value associated with the financial product during the first time period and the second time period.

22. The computer-readable medium of claim 21, wherein the method further comprises:
   storing the results data in the least one data storage device.

23. The computer-readable medium of claim 20, wherein the financial product is a variable annuity contract.

24. The computer-readable medium of claim 20, wherein the value associated with the financial product includes: a dollar value of an account associated with the financial product; a dollar value of fees taken by a financial services company associated with the financial product; or a dollar value of withdrawals taken by the customer.

25. The computer-readable medium of claim 20, wherein the spreadsheet data structure further includes information that describes a change in market conditions, and wherein the second formula is further based on the information that describes the change in market conditions.

26. The computer-readable medium of claim 20, wherein the first time period is an initial time period, and wherein the first formula is based on an age of the customer during the initial time period and the value associated with the financial product during the initial time period.

27. The computer-readable medium of claim 20, wherein the spreadsheet data structure further includes death rate information that describe a probability of death of the customer, and wherein the second formula is further based on the death rate information.

28. The computer-readable medium of claim 20, wherein the compilable software code is defined according to one of: C; C++; Java; C#; or Visual Basic.

29. The computer-readable medium of claim 20, wherein the compilable software code includes the use of one or more of: Close to Metal (CTM); Compute Unified Device Architecture (CUDA); Open Computing Language (OpenCL); or DirectCompute/High Level Shader Language (HLSL).

30. The computer-readable medium of claim 29, wherein the at least one processor includes a Graphics Processing Unit (GPU).

* * * * *

UNITED STATES PATENT AND TRADEMARK OFFICE
CERTIFICATE OF CORRECTION

| | |
|---|---|
| PATENT NO. | : 8,583,530 B2 |
| APPLICATION NO. | : 13/050703 |
| DATED | : November 12, 2013 |
| INVENTOR(S) | : Peter K. Esbensen |

It is certified that error appears in the above-identified patent and that said Letters Patent is hereby corrected as shown below:

IN THE SPECIFICATION

Column 2, Line 29, after the word "storage" delete "device that that" and insert -- device that --, therefor.

Column 2, Line 52, after the word "data" delete "structure that that" and insert -- structure that --, therefor.

Column 3, Line 17, after the word "data" delete "structure that that" and insert -- structure that --, therefor.

Column 3, Line 49, after the numbers "5-6" delete "shows" and insert -- show --, therefor.

Column 7, Line 32, after the numbers "3C-3E" delete "shows" and insert -- show --, therefor.

Column 8, Line 11, after the word "the" delete "financial model area 308" and insert -- financial model area 304 --, therefor.

Column 8, Line 13, after the word "the" delete "financial model area 308" and insert -- financial model area 304 --, therefor.

Column 8, Line 15, after the word "the" delete "financial model area 308" and insert -- financial model area 304 --, therefor.

Column 8, Line 28, after the word "the" delete "financial model area 308" and insert -- financial model area 304 --, therefor.

Column 10, Line 39, after the word "non-" delete "GPGU" and insert -- GPGPU --, therefor.

Signed and Sealed this
Eleventh Day of March, 2014

Michelle K. Lee
*Deputy Director of the United States Patent and Trademark Office*

CERTIFICATE OF CORRECTION (continued)
U.S. Pat. No. 8,583,530 B2

IN THE SPECIFICATION (continued)

At Column 14, Line 12, after the word "with" delete "reference to 1-9" and insert -- reference to FIGS. 1-9 --, therefor.

IN THE CLAIMS

In Column 14, Line 25, in Claim 1, after the word "data" delete "structure that that" and insert -- structure that --, therefor.

In Column 15, Line 36, in Claim 11, after the word "data" delete "structure that that" and insert -- structure that --, therefor.

In Column 16, Line 40, in Claim 20, after the word "data" delete "structure that that" and insert -- structure that --, therefor.